US 9,973,894 B2

(12) United States Patent
Pan et al.

(10) Patent No.: US 9,973,894 B2
(45) Date of Patent: May 15, 2018

(54) PROMPTING METHOD AND APPARATUS

(71) Applicant: SHANG HAI PAN SHI TOU ZI GUAN LI YOU XIAN GONG SI, Shanghai (CN)

(72) Inventors: ZhongGuang Pan, Shanghai (CN); YanMei Teng, Beijing (CN)

(73) Assignee: SHANG HAI SHI TOU ZI GUAN LI YOU XIAN GONG SI, Shanghai (CN)

( * ) Notice: Subject to any disclaimer, the term of this patent is extended or adjusted under 35 U.S.C. 154(b) by 0 days. days.

(21) Appl. No.: 15/379,470

(22) Filed: Dec. 14, 2016

(65) Prior Publication Data
US 2018/0063677 A1 Mar. 1, 2018

(30) Foreign Application Priority Data
Aug. 24, 2016 (CN) .......................... 2016 1 0718741

(51) Int. Cl.
*H04W 4/00* (2018.01)
*H04W 4/02* (2018.01)
*G06Q 30/06* (2012.01)
*H04W 4/04* (2009.01)

(52) U.S. Cl.
CPC ........ *H04W 4/023* (2013.01); *G06Q 30/0639* (2013.01); *H04W 4/043* (2013.01)

(58) Field of Classification Search
CPC ... G06Q 30/0639; H04W 4/023; H04W 4/043
USPC ...................................... 455/456.3
See application file for complete search history.

(56) References Cited

U.S. PATENT DOCUMENTS

| 2005/0021561 A1* | 1/2005 | Noonan ................. G06Q 30/06 |
| 2005/0044011 A1* | 2/2005 | Deal .................. G06Q 30/0639 705/26.9 |
| 2007/0191026 A1* | 8/2007 | Teplitsky ............... G01C 21/20 455/456.3 |
| 2013/0173435 A1* | 7/2013 | Cozad, Jr. ............ G06Q 10/087 705/28 |
| 2014/0108193 A1* | 4/2014 | Goulart .............. G06Q 30/0633 705/26.8 |
| 2014/0324627 A1* | 10/2014 | Haver ................ G06Q 30/0639 705/26.9 |
| 2015/0170258 A1* | 6/2015 | Kulig ................. G06Q 30/0639 705/26.9 |
| 2015/0221010 A1* | 8/2015 | Ming ................. G06Q 30/0623 705/26.61 |

(Continued)

*Primary Examiner* — William Nealon
(74) *Attorney, Agent, or Firm* — Maschoff Brennan

(57) ABSTRACT

A prompting method includes: sending, by a server, a navigation map requested to be outputted to a user device when receiving a map output request of the user device, the navigation map being outputted by the user device, wherein the navigation map is pre-generated according to an article position of an article in a place; acquiring article identification information of a pre-searching article; acquiring an article position of the pre-searching article in the place; acquiring a device position of the user device in the place; and generating a navigation prompt message according to a distance between the device position and an article position of each pre-searching commodity, and triggering the user device to output the navigation prompt message in the navigation map, the navigation prompt message being used for prompting the article position of each pre-searching article and a distance to the device position to a user.

21 Claims, 6 Drawing Sheets

(56) References Cited

U.S. PATENT DOCUMENTS

2016/0223339 A1\* 8/2016 Pellow ................ G01C 21/206

\* cited by examiner

PROMPTING METHOD AND APPARATUS

CROSS REFERENCE TO RELATED APPLICATIONS

This application claims priority under 35 U.S.C. § 119(a) to Chinese Patent Application No. 2016107187412, filed Aug. 24, 2016, the entire contents of which is hereby incorporated by reference.

TECHNICAL FIELD

The present application relates to the field of electronic technologies, and more particularly, to a prompting method and a prompting apparatus.

BACKGROUND

With the economic development and improvement of living standards, emporiums, supermarkets, warehouses and other large shopping places capable of storing articles are gradually rising.

Complex types of articles are placed in emporiums, supermarkets, warehouses and other places, while there are thousands of categories and quantities of the articles and the placing positions thereof are not sure; therefore, it will usually spend much time for a user to find an article to be searched in these places, which results in slow efficiency and great inconvenience.

SUMMARY

In light of this, a technical problem to be solved by the present application is to provide a prompting method and a prompting apparatus, which improves the convenience for searching articles, and increases the searching efficiency.

In order to solve the foregoing technical problem, a first aspect of the present application provides a prompting method, including:

sending, by a server, a navigation map requested to be outputted to a user device when receiving a map output request of the user device, the navigation map being outputted by the user device, wherein the navigation map is pre-generated according to an article position of each article in a place;

acquiring article identification information of a pre-searching article;

acquiring an article position of the pre-searching article in the place;

acquiring a device position of the user device in the place; and generating a navigation prompt message according to a distance between the device position and an article position of each pre-searching article, and triggering the user device to output the navigation prompt message in the navigation map, the navigation prompt message being used for prompting the article position of each pre-searching article and a distance to the device position to a user.

A second aspect of the present application provides a prompting method, including:

sending, by a user device, a map output request to a server;

acquiring a navigation map requested to be outputted by the user device and provided by the server, and outputting the navigation map, the navigation map being pre-generated according to an article position of an article in a place;

acquiring a navigation prompt message sent by the server, the navigation prompt message being generated by the server according to an article position of the pre-searching article in the place and a device position of the user device in the place, and according to a distance between the device position and an article position of each pre-searching article; and outputting the navigation prompt message in the navigation map, the navigation prompt message being used for prompting the article position of each pre-searching article and a distance to the device position to a user.

A a third aspect of the present application provides a prompting apparatus applied to a server, including:

a map sending module configured to send a navigation map requested to be outputted to a user device when receiving a map output request of the user device, the navigation map being outputted by the user device, wherein the navigation map is pre-generated according to an article position of an article in a place;

an article determination module configured to acquire article identification information of a pre-searching article;

an article position determination module configured to acquire an article position of the pre-searching article in the place;

a user position determination module configured to acquire a device position of the user device in the place; and a first prompt triggering module configured to generate a navigation prompt message according to a distance between the device position and an article position of each pre-searching article, and trigger the user device to output the navigation prompt message in the navigation map, the navigation prompt message being used for prompting the article position of each article to be searched and a distance to the device position to a user.

A third aspect of the present application provides a prompting apparatus applied to a user device, including:

a map output module configured to send a map output request to a server, acquire a navigation map requested to be outputted by a user device and provided by the server and output the navigation map, the navigation map being pre-generated according to an article position of an article in a place; and a first prompting module configured to acquire a navigation prompt message sent by the server, and output the navigation prompt message in the navigation map, the navigation prompt message being generated by the server according to an article position of the pre-searching article in the place and a device position of the user device in the place, and according to a distance between the device position and an article position of each pre-searching article, and the navigation prompt message being used for prompting the article position of each pre-searching article and a distance to the device position to a user.

Compared with the prior art, the technical effects that may be obtained by the present application include:

the navigation prompt message is outputted in the navigation map to prompt the article position of each pre-searching article and the distance to the device position to the user. When searching the article, the user may intuitively acquire the article position of the pre-searching article and the distance to the user according to the navigation prompt message in the navigation map, thus being capable of quick finding the pre-searching article in the place, so that the searching time is saved, the searching convenience is improved, and the searching efficiency is increased.

Of course, implementing any product of the present application does not necessarily need to achieve all of the technical effects described above at the same time.

BRIEF DESCRIPTION OF THE DRAWINGS

The drawings illustrated herein are intended to provide further understanding of the present application, constituting a part of the present application. Exemplary embodiments and explanations of the present application here are only for explanation of the present invention, but are not intended to limit the present application. In the drawings.

DETAILED DESCRIPTION

The implementation manners of the present application will be explained in details with reference to the drawings and embodiments hereinafter, so that the realization process of how to solve the technical problems using a technical means and achieve the technical efficacy can be sufficiently understood and implemented accordingly.

The technical solutions of the present application are mainly applied to supermarkets, emporiums, warehouses and other places for storing a number of articles, and especially applied to shopping places like supermarkets, emporiums, etc. Because there are complex types of articles in the shopping places, it will usually spend much time for a user to find an article expected to be purchased, which results in extreme inconvenience in searching commodities, and affects the searching efficiency of the commodities, so as to affect the shopping efficiency.

In order to solve the technical problems in the prior art that article searching is inconvenient and the searching efficiency is affected, in the embodiments of the present application, a server sends a navigation map to a user device to output, the navigation map being pre-generated according to an article position of each article in a place; a navigation prompt message is generated according to an article position of a pre-searching article and a device position of the user device, and according to a distance between the device position and the article position of each pre-searching article, the navigation prompt message being outputted by the user device in the navigation map; moreover, the navigation prompt message is also used for prompting the article position of each pre-searching article and a distance to the device position to a user. When searching the article, the user may intuitively acquire the article position of the pre-searching article and the distance to the user according to the navigation prompt message in the navigation map, thus being capable of quick finding the pre-searching article in the place, so that the searching time is saved, the searching convenience is improved, and the searching efficiency is increased.

The technical solutions of the present application will be described in details hereinafter with reference to the drawings.

Figure 1:
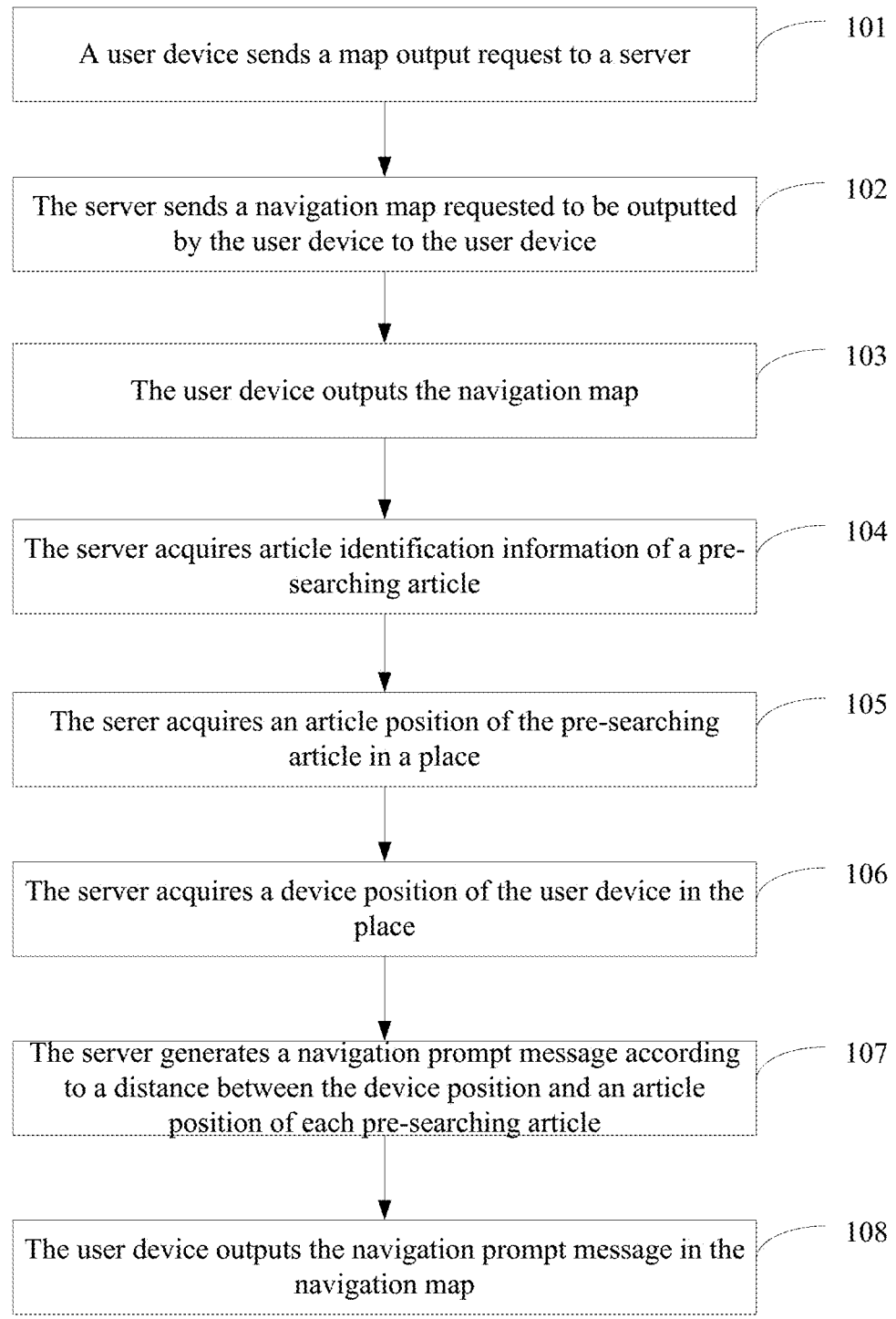
FIG. 1 is a flow chart of one embodiment of a prompting method of the embodiments of the present application.

FIG. 1 is a flow chart of one embodiment of a prompting method provided by the embodiments of the present application. The method may include the several steps as follows.

In step 101: a user device sends a map output request to a server.

In step 102: the server sends a navigation map requested to be outputted by the user device to the user device.

In step 103: the user device outputs the navigation map.

Wherein, the navigation map is pre-generated by the server according to an article position of each article in a place. Different articles are distinguished through article identification information. The article identification information may include an article type name, an article brand name and/or an article model, or the like.

During practical application, one company may have more places, and each place may be corresponding with a navigation map.

The map output request may carry a place identity and other information. The server may search a navigation map corresponding to the place identity and send the navigation map to the user device, then the user device can output the navigation map.

The user device may be a mobile phone, a tablet and other portable device used by the user, and the map output request is triggered by the user through the user device, so that the user can view the navigation map.

The server may be a background processing system in the place, and may include one or more processing devices.

In step 104: the server acquires article identification information of a pre-searching article.

Wherein, as a probable implementation manner, the article identification information may be an article type name, for example, "shampoo", "milk powder", or the like.

The article identification information of the pre-searching article may be provided by the user through the user device, for example, inputted by the user, and then sent to the server by the user device, then the server may take an article corresponding to the article identification information as the pre-searching article.

As another probable implementation manner, the navigation map is pre-generated according to the article position of the article in the place. Therefore, a position of each article in the place may be viewed through the navigation map. The article identification information may be outputted at each article position in the navigation map so as to distinguish different articles.

The user may use the user device to perform a recording operation at a display position of any article in the navigation map according to the article identification information, then the server may take the article as the pre-searching article and record article identification information of the pre-searching article.

Therefore, the acquiring the article identification information of the pre-searching article by the server is specifically acquiring a recorded pre-searching article and the article identification information of the pre-searching article.

Moreover, the use may perform a triggering operation at the display position of any article. The user device generates an article output request after detecting the triggering operation and sends the article output request to the server, then the server may send first article information of an article requested to be outputted in the article output request to the user device and then the first article information is outputted through the user device. The first article information may include an article identity, an article price, an article origin, an article introduction content and other information.

The user may also trigger the user device to generate a pre-searching request with respect to the first article information, and the user device sends the pre-searching request to the server, then the server may take an article corresponding to the first article information as a pre-searching commodity, and record article identification information of the pre-searching commodity.

In one practical application, the technical solutions of the embodiments of the present application may be applied to supermarkets, shopping malls and other shopping places. The article refers to a commodity specifically, and the pre-searching article may refer to a pre-purchasing commodity specifically. The pre-searching request may refer to a pre-purchasing request specifically. The user may select any article according to the article identification information in the navigation map, for example, perform a triggering operation with respect to a display position corresponding to any article in the navigation map, so that the user device may be triggered to generate an article output request; then the user device receives the article output request and sends the article output request to the server.

The server may acquire the article output request sent by the user device; send the first article information of the article requested to be outputted in the article output request to the user device, the first article information being output by the user device; when receiving a pre-purchasing request of the user device, the server may take the article corresponding to the first article information as a pre-purchasing commodity and record article identification information of the pre-purchasing commodity, wherein the pre-purchasing request may also carry a purchasing quantity and other purchasing information, so that the server may record purchasing information of the pre-purchasing commodity and output the purchasing information to a pre-purchasing list of the user device, wherein the pre pre-purchasing list may include purchasing information of each pre-purchasing commodity, etc. Therefore, after the user device outputs the navigation map, the server may acquire the article identification information of the pre-purchasing commodity from records; moreover, the article identification information of the pre-purchasing commodity may be acquired from the records after receiving a navigation request sent by the user device. The navigation request may be triggered with respect to the pre-purchasing list outputted by the user device.

Wherein, more pre-searching articles may be included.

Wherein, step 104 may be performed after receiving the navigation request, and the navigation request may be generated and sent according to a navigation triggering operation of the user after the user device outputs the navigation map.

In step 105: the serer acquires an article position of the pre-searching article in the place.

Different pre-searching articles may be recognized according to the article identification information, which may specifically be: searching and acquiring the article position of the pre-searching article in the place from the navigation map according to the article identification information.

In step 106: the server acquires a device position of the user device in the place.

The device position of the user device may be positioned and uploaded to the server by the user device. Certainly, it may also be determined by the server, which will be introduced in details in the embodiments hereinafter.

Wherein, the device position of the user device may be acquired and updated in real time.

In step 107: the server generates a navigation prompt message according to a distance between the device position and an article position of each pre-searching article.

In step 108: the user device outputs the navigation prompt message in the navigation map.

Wherein, the navigation prompt message is used for prompting the article position of each pre-searching article and a distance to the device position to the user; and certainly, may be used for prompting a specific distance between each pre-searching article and the device position to the user, etc.

The server generates the navigation prompt message according to the distance between the article position of each pre-searching article and the device position, and triggers the user device to output the navigation prompt message, to facilitate the user to view; and the user may determine the distance of each pre-searching article to the user according to the navigation prompt message, thus being capable of quickly finding the pre-searching article in the place, so that the searching time is saved, the searching convenience is improved, and the searching efficiency is increased.

Wherein, as another embodiment, the server, after acquiring the article position of the pre-searching article in the place, may generate an article prompt message according to the article position of the pre-searching article; and trigger the user device to output a corresponding article prompt message at the display position of each pre-searching article in the navigation map. The article prompt message is used for prompting the article position of the pre-searching article in the place to the user.

The user device, after receiving the article prompt message of the server, can output the article prompt message at the display position of each pre-searching article in the navigation map according to the article position of the pre-searching article. The article prompt message is used for prompting the article position of each pre-searching article to the user.

As another embodiment, the article prompt message may be generated according to the article position of the pre-searching article in case that the device position of the user device is not in the place, or the device position of the user device in the place cannot be acquired; and then the user device is triggered to output the corresponding article prompt message at the display position of each pre-searching article in the navigation map.

That is, during practical application, for instance, in a supermarket, an emporium or other shopping place, the user may acquire a navigation map corresponding to the shopping place through the user device firstly when not entering the shopping place, for instance, at home or other place, and select a pre-purchasing commodity, then the server generates an article prompt message of the pre-purchasing commodity, and generates a navigation prompt message in the navigation map according to the device position of the user device when the user device is detected in the shopping place.

Certainly, as another embodiment, the pre-searching article is a pre-purchasing commodity when in the shopping place; after the user pre-records the pre-purchasing commodity in the server through the user device, the user device may also output purchasing information of the pre-purchasing commodity, for example, a commodity pre-purchasing quantity; at this moment, the user may submit a purchasing request of the pre-purchasing commodity to the server through the user device, then the user generates a transaction order according to the purchasing information of the pre-purchasing commodity after receiving the purchasing request, and sends the transaction order to the user device, wherein the purchasing information is carried in the purchasing request, and may include a purchasing quantity and other commodity information; the user device outputs the transaction order, and the user may trigger a payment request after confirming the transaction order, then the user device invokes a third party system to perform online payment according to a total commodity price of the pre-purchasing commodity, and sends transaction confirmation information to the server after the online payment is successful. Then the server may prompt a distribution personnel to distribute commodity according to the transaction confirmation information.

Wherein, the transaction order may include a commodity pick-up address or a commodity receiving address, so that the user may pick up the commodity at the commodity pick-up address, or the distribution personnel delivers the commodity according to the commodity receiving address.

Wherein, in order to further improve the searching convenience, and especially when more pre-searching articles are included, as a probable implementation manner, the generating, by the server, the navigation prompt message according to the distance between the device position and the article position of each pre-searching article may be as follows:

the server determines an arrangement number of each pre-searching article according to an arrangement sequence of distances between the device position and the article position of each pre-searching article from the near to the distant; and generates the navigation prompt message including the arrangement number of each pre-searching article, and triggers the user device to output the arrangement number at the display position of each pre-searching article in the navigation map.

The user may determine the distance of the pre-searching article to the user according to the arrangement number.

Wherein, the arrangement number, for example, may be represented by Arabic numerals like 1, 2, 3, 4, . . . The smaller the numeral is, the closer the distance is.

Wherein, the navigation prompt message may also include distance information of the device position to the article position of each pre-searching article, for example, 0.8 m, etc.

Moreover, as another embodiment, the server may also generate navigation route information according to the device position and the article position of each pre-searching article. The navigation route information is used for prompting the user how to move in the place.

Therefore, the generating, by the server, the navigation prompt message including the arrangement number of each pre-searching article, and triggering the user device to output the arrangement number at the display position of each pre-searching article in the navigation map may include the followings.

Navigation route information is generated according to the article position of each pre-searching article and the distance between the device position and the article position of each pre-searching article; to be specific, the navigation route information may be generated according to the distance between the device position and the article position of each pre-searching article, so that the navigation route information preferentially prompts the user to go to an article position of an article closet to the device position.

The navigation prompt message including the arrangement number of each pre-searching article and the navigation route information are generated, and the user device is triggered to output the arrangement number at the display position of each pre-searching article in the navigation map and output the navigation route information in the navigation map.

Wherein, the navigation map may be pre-generated by the server.

As another embodiment, each article shelf in the place may be provided with a wireless device.

The navigation map may be pre-generated according to a following manner:

positioning a code scanning position of a hand-held device during each code scanning according to a received wireless signal sent by the wireless device when the hand-held device performs code scanning on each article in the article shelf and a position of the wireless device, and taking the code scanning position of the hand-held device during each code scanning as an article position of an article subjected to the code scanning of the handheld device; and generating the navigation map according to the article position of each article.

The wireless device may be a device that sends wireless signals and/or receives wireless signals, and may a device that adopts Wi-Fi, Bluetooth, infrared rays, ultra-wideband, RFID, ZigBee or ultrasonic technology, or the like. During practical application, a low power consumption Bluetooth device may be selected as the wireless device; at this moment, the wireless signal is a Beacon (Beacon) signal namely.

To perform code scanning on each article in the article shelf by the hand-held device specifically refers to scanning an article information code on an article overwrap on the article shelf.

During practical application, in order to facilitate the user to search an article and view related information of the article, for instance, a name, a price, or the like, a label may be usually arranged on the article shelf for each article, and the label is used for displaying second article information of the article corresponding thereof, wherein the second article information may be the first article information, and may certainly be partial information contents in the first article information, for instance, the second article information may include an article identity, an article price and other key information.

In a shopping place like a supermarket, an emporium, or the like, the label is namely a price label, each article is namely a commodity, and each article is usually corresponding to one price label for displaying a name, a price and other key information of the article.

Wherein, the label may either be a paper label or an electronic label. The electronic label is an electronic display device placed on the article shelf to replace a traditional paper label, can display such information as the price, information code, trademark and/or inventory of the article, or the like, and may modify the information displayed.

In the shopping place like a supermarket, an emporium, or the like, the electronic label is namely an electronic shelf label (Electronic Shelf Label System, ESL).

When the label is an electronic label, the article and the electronic label may also be bound. Each label is also provided with a label information code, for example, a one-dimensional code, or a two-dimensional code, for identifying the label.

In case that the article is bound to the electronic label, i.e., a corresponding relationship between the article information code and the label information code is saved in the server, the hand-held device may also perform code scanning on a label corresponding to each article in the article shelf; so that the server may determine the corresponding article according to the label information code in the code scanning information, thus being capable of determining a wireless device corresponding to the article.

In case that the article is not bound to the electronic label, the hand-held device, while performing code scanning on each article in the article shelf, may also perform code scanning on the electronic label corresponding to the article, so that the code scanning information corresponding to each article may include the article information code and the label information code; the server may also search second article information like an article name and/or article price according to the article information code in the code scanning information, and send the second article information to the electronic label corresponding to the label information code, so that the electronic label displays the second article information of the corresponding article, and then the corresponding relationship between the article information code and the label information code is saved in the server, so as to bind the article to the electronic label.

Wherein, both the article information code of the article and the label information code of the label may be a one-dimensional code, or a two-dimensional code, etc. The information code may be used for identifying the article or label uniquely.

Wherein, as a probable implementation manner, a wireless device may be arranged in each layer of bracket in each article shelf to facilitate the hand-held device to acquire a sending signal of the wireless device. In different brackets, the wireless devices may be arranged at the same positions or different positions.

The positioning the code scanning position of the hand-held device during each code scanning according to the received wireless signal sent by the wireless device and the position of the wireless device when the hand-held device performs code scanning may be that the position is calculated and acquired according to a signal intensity of the wireless signal of the wireless device received by the hand-held device and the position of the wireless device.

A distance between the hand-held device and the wireless device may be calculated according to the signal intensity of the wireless device received by the hand-held device, so that the code scanning position of the hand-held device may be calculated and acquired according to the distance between the hand-held device and the wireless device as well as the position of the wireless device. To be specific, a centroid algorithm may be adopted to calculate and acquire the code scanning position of the hand-held device by using the distance between the hand-held device and the wireless device and the position of the wireless device.

The user device may receive wireless signals of more wireless devices, and wireless signals of N wireless devices may be selected and used for calculation according to a space dimension M of a position coordinate space and according to a descending sequence of signal intensities. Wherein, N is greater than or equal to M+1, and to be specific, may be equal to M+1. The code scanning position of the hand-held device may be calculated and acquired by using the distance between the hand-held device and the N wireless devices and the positions of the N wireless devices.

Wherein, as a probable implementation manner, the distance between the hand-held device and the wireless device may be calculated according to the wireless signal of the wireless device received by the hand-held device using a following formula:

$$d = 10^{\frac{|R|-A}{10*n}};$$

R represents a signal intensity; d represents a distance between the hand-held device and the wireless device; A represents a signal intensity of a wireless signal sent by a sending device and received by a receiving device when the distance is 1m; and n represents an environmental attenuation factor.

As another probable implementation manner, the distance between the hand-held device and the wireless device may be calculated according to the wireless signal of the wireless device received by the hand-held device using a following formula:

$$d^2 = C^2(R_0 - R);$$

R represents a signal intensity, d represents the distance between the hand-held device and the wireless device, C is a conversion scaling factor, $R_0$ may be an international standard value, or a mean signal intensity received when sending devices with known positions are infinitely close to receiving devices of different models.

Of course, the embodiments of the present application are not limited to the two possible implementation manners above, and the distance between the hand-held device and the wireless device may be calculated by using different manners according to the practical application situations.

As another probable implementation manner, when arranging the wireless device in the article shelf, each article in each article shelf may be corresponding to one wireless device.

Then the positioning the code scanning position of the hand-held device during each code scanning according to the received wireless signal sent by the wireless device when the hand-held device performs code scanning on each article in the article shelf and the position of the wireless device may include:

determining a wireless device closest to the hand-held device according to the received wireless signal sent by the wireless device when the handheld device performs code scanning on each article in the article shelf; and positioning a position of the closest wireless device as the code scanning position of the hand-held device during code scanning As another embodiment, each article shelf in the place is provided with a wireless device.

The navigation map is pre-generated according to a following manner.

The server receives the article position of each article uploaded by the hand-held device, wherein, the article position is the code scanning position of the hand-held device during each code scanning according to the received wireless signal sent by the wireless device when the hand-held device performs code scanning on each article in the article shelf and the position of the wireless device.

The navigation map is generated according to the article position of each article.

That is, in the embodiment, the article position of the article subjected to code scanning of the hand-held device may be acquired by the positioning of the hand-held device.

Wherein, the position of the wireless device may be acquired by the hand-held device from the server.

Wherein, when arranging the wireless device in the article shelf, each article in each article shelf may be corresponding to one wireless device.

Then the positioning the code scanning position during each code scanning according to the wireless signal of the wireless device received during each code scanning and the position of the wireless device may be as follows.

The hand-held device determines the position of the wireless device closest to the hand-held device according to the wireless signal of the wireless device received during each code scanning and the position of the wireless device.

As another embodiment, the wireless device is arranged in each article shelf in the place, and each wireless device is corresponding to an article and a label. The label is used for displaying second article information of a corresponding article thereof; and the second article information, for example, may include an article identity, an article price, an article origin and other information.

The navigation map may be pre-generated according to a following manner:

searching, by a server, a corresponding relationship between different labels and different wireless devices according to code scanning information acquired by the hand-held device through scanning each article in the article shelf and a corresponding label of the article, taking a position of a wireless device corresponding to a label of each article subjected to code scanning as an article position of the article; and generating the navigation map according to the article position of each article.

Wherein, when the label is an electronic label, each wireless device is integrated in the electronic label corresponding thereof, and the corresponding relationship between different labels and different wireless devices may be that a corresponding relationship between each wireless device and the label is uploaded to the server after each wireless device is connected to the server.

As another embodiment, the wireless device is arranged in each article shelf in the place, and each wireless device is corresponding to an article. Each wireless device is provided with a device information code.

The navigation map may be pre-generated according to a following manner:

acquiring, by the server, code scanning information according to the code scanning performed by the hand-held device on each article in the article shelf, and the code scanning performed on the corresponding wireless device of the article;

taking a position of the wireless device corresponding to the device information code as the article position of the article subjected to code scanning according to the device information code in the code scanning information; and generating the navigation map according to the article position of each article.

In each embodiment above, the server may also position a position of the hand-held device not subjected to code scanning while not performing code scanning according to the received wireless signal sent by the wireless device when the hand-held device does not perform code scanning and the position of the wireless device;

then the generating the navigation map according to the article position of each article may include:

determining an article shelf position of each article shelf according to the position of each wireless device; and generating the navigation map according to each article shelf position, the article position of each article, and each shelf channel position.

Certainly, as another implementation manner, the shelf channel position may also be acquired through the positioning of the hand-held device according to the received wireless signal of the wireless device when the hand-held device does not perform code scanning and the position of the wireless device.

Because there are more articles in the place, the articles may be classified differently according to article attributes, and then the articles are placed according to different categories. Different places have different classifying demands, for instance, the articles may be classified according to a fresh category, a grain & oil and seasoning category, a wine and instant drinks category, a daily and household category, a culture & sports and household appliance category in such a shopping place like a supermarket. For another example, the articles may be classified according to a shampoo category, a towel category, a TV category, a laundry machine category, etc.

As another embodiment, the generating the navigation map according to each article shelf position, the article position of each article and each article shelf position may include:

generating an article category distribution sub-map according to the article position of each article and an article category of each article;

drawing an article shelf and a shelf channel with respect to each article category in the article category distribution sub-map and according to the article shelf position and the shelf channel position, and generating a shelf distribution sub-map corresponding to each article category;

generating a shelf article distribution sub-map corresponding to each article shelf with respect to each article shelf in the shelf distribution sub-map and according to the article position of each article; and establishing a correlation relationship among the article category sub-map, the shelf distribution sub-map, and the shelf article distribution sub-map, and generating the navigation map.

Wherein, the shelf article distribution sub-map may also include article identification information, an article price, an article picture and other information of each article.

Wherein, an article category to which the article shelf belongs may be labeled in the shelf distribution sub-map.

Because the article category may further be divided, each article category may possibly be not corresponding to one article shelf only. Each article shelf may possibly be corresponding to more article categories.

It is provided that the article category may further be divided into different article types acquired, for instance, a daily category article may further be divided into shampoo, towel, etc.

Therefore, the drawing the article shelf and the shelf channel with respect to each article category in the article category distribution sub-map and according to the article shelf position and the shelf channel position, and generating the shelf distribution sub-map may be as follows:

drawing the article shelf and the shelf channel with respect to each article type in each article category in the article category distribution sub-map and according to the article shelf position and the shelf channel position corresponding to the article type, and generating the shelf distribution sub-map.

Wherein, when generating the navigation map, a boundary of the navigation map may be determined firstly. Wherein, the boundary of the navigation map may be determined according to a building size labeled in an indoor building drawing.

Therefore, the article category distribution sub-map is specifically generated in the boundary of the navigation map according to the article position of each article and the article category of each article.

When drawing the article shelf and the shelf channel, and an indoor channel such as a stairway, an elevator and a and the like fire-fighting access may also be included, and the indoor channel may be determined from the building drawing.

Therefore, the drawing the article shelf and the shelf channel with respect to each article category in the article category distribution sub-map and according to the article shelf position and the shelf channel position, and generating the shelf distribution sub-map may be as follows:

drawing the article shelf, the shelf channel and the indoor channel with respect to each article category in the article category distribution sub-map and according to the article shelf position, the shelf channel position and an indoor channel position, and generating the shelf distribution sub-map.

Because more rooms may be included in the place, and the different rooms may be arranged in the same floor or different floors, the wireless device is arranged in the article shelf of each room. Article categories placed in each room may be different, for instance, daily category articles may be placed in the rooms at the first floor, and household category articles may be placed in the rooms at the second floor.

The server may determine the article position in each room according to the position of the wireless device. The generating, by the server, the article category distribution sub-map according to the article position of each article and the article category of each article may be as follows:

generating an article category distribution sub-map of each room according to the article position of each article in each room and the article category of each article.

Wherein, when the wireless device is arranged in the article shelf of the place, the user device may send a wireless signal to the wireless device or receive a wireless signal sent by the wireless device.

Therefore, the acquiring, by the server, the device position of the user device in the place may specifically be as follows:

positioning the device position of the user device according to the wireless signal of the wireless device received by the user device and the position of the wireless device corresponding to the wireless signal.

Wherein, the position of the wireless device may either be preset in each embodiment above, or be acquired through calculation.

In a probable implementation manner, the wireless device may include a first class device and a second class device, wherein a position of the first class device is known; the first class device may upload the wireless signal received to the server; and the second class device may upload the wireless signal received to the server. In order to facilitate signal transmission, a first control device, which may specifically be an AP (Wireless Access Point, Wireless Access Point) may be arranged in an indoor ceiling of the place, and the wireless signals received by the first class device and the second device are uploaded to the server through the first control device.

The position of the wireless device may be pre-determined according to a following manner:

the user uses the first class device and/or the second class device with determined position as the known device, and positions a position of any second class device with indeterminate position according to the position of the known device and a wireless signal sent by any second class device with indeterminate position and received by the known device.

Wherein, the second class device may be specifically arranged in the article shelf.

In another probable implementation manner, a second control device with known position is arranged in the indoor ceiling of the place. The second control device may be arranged in the indoor ceiling according to a preset arrangement.

The second control device may upload the wireless signal received by the second control device and sent by the wireless device to the server;

then the position of the wireless device may be pre-determined according to a following manner:

positioning, by the server, the position of the wireless device according to the wireless signal received by the second control device and sent by the wireless device and a position of the second control device.

It is knowable from the descriptions above that the navigation map may include an article category distribution sub-map, a shelf distribution sub-map and a shelf article distribution sub-map.

As another embodiment, when the server receives a map output request of the user device, a pre-generated navigation map is sent to the user device specifically, and an article category distribution sub-map in the navigation map is outputted by the user device.

After acquiring the device position of the user device in the place, the method may also include:

when a distance between the device position and any article category is less than a first preset distance, triggering the user device to output a shelf distribution sub-map corresponding to the article category; and when a distance between the device position and any article shelf is less than a second preset distance, trigger the user device to output a shelf article distribution sub-map of the article shelf.

The server may generate a first triggering request when the distance between the device position and any article category is less than the first preset distance, send the first triggering request to the user device, and output a shelf distribution sub-map corresponding to the article category when the user receives the first triggering request; generate a second triggering request when the distance between the device position and any article category is less than the second preset distance, send the second triggering request to the user device, and output a shelf distribution sub-map corresponding to the article category when the user receives the second triggering request.

That is, the shelf distribution sub-map is outputted and an article shelf distribution schematic diagram corresponding to the article category is displayed when the user enters the place and move close to the region position of any article category; further, when the user approaches to any article shelf, a shelf article distribution sub-map corresponding to the article shelf is outputted.

Of course, excluding outputting different distribution sub-maps according to the position transformation of the user, as another embodiment, different sub-maps may also be outputted according to a user request.

For example, when the user device outputs the article category distribution sub-map and the user device receives a first output request triggered by the user with respect to any article category, the first output request is sent to the server; the server triggers a shelf distribution sub-map corresponding to the article category of the request outputted by the user device after receiving the first output request; in the shelf distribution sub-map, when the user device receives a second output request triggered by the user with respect to any article category, then the second output request is sent to the server; and the server triggers a shelf distribution sub-map corresponding to the article category of the request outputted by the user device after receiving the second output request.

To facilitate understanding, it is exemplary and explanatory hereinafter with reference to one practical application. It is provided that the pre-searching articles submitted by the user device include facial cleanser, shampoo, bath towel, coffee, cornmeal, nut, wine, seasoning and aquatic products in a shopping place which is a supermarket.

The server may firstly determine article positions of the pre-searching articles in the place, and output an article prompt message of each pre-searching article in the navigation map for identifying the positions of the pre-searching articles in the navigation map to prompt the user.

When the navigation map includes an article category distribution sub-map, a shelf distribution sub-map and a shelf article distribution sub-map, and after the server generates the navigation prompt message, the corresponding article prompt message can be outputted at least when the user device outputs the article category distribution sub-map and the shelf distribution sub-map.

When the navigation prompt message includes an arrangement number, a corresponding arrangement number may also be outputted in any distribution sub-map. It is provided that the articles are arranged according to an arrangement sequence of distances between the device position and the article position of each pre-searching article from the near to the distant, then the arrangement numbers corresponding to the facial cleanser, shampoo, bath towel, coffee, cornmeal, nut, wine, seasoning and aquatic products are respectively as follows: 1, 2, 3, 4, 5, 6, 7, 8 and 9, wherein the arrangement numbers are represented by Arabic numerals. The smaller the numeral is, the closer the distance to the user is.

Figure 2A:
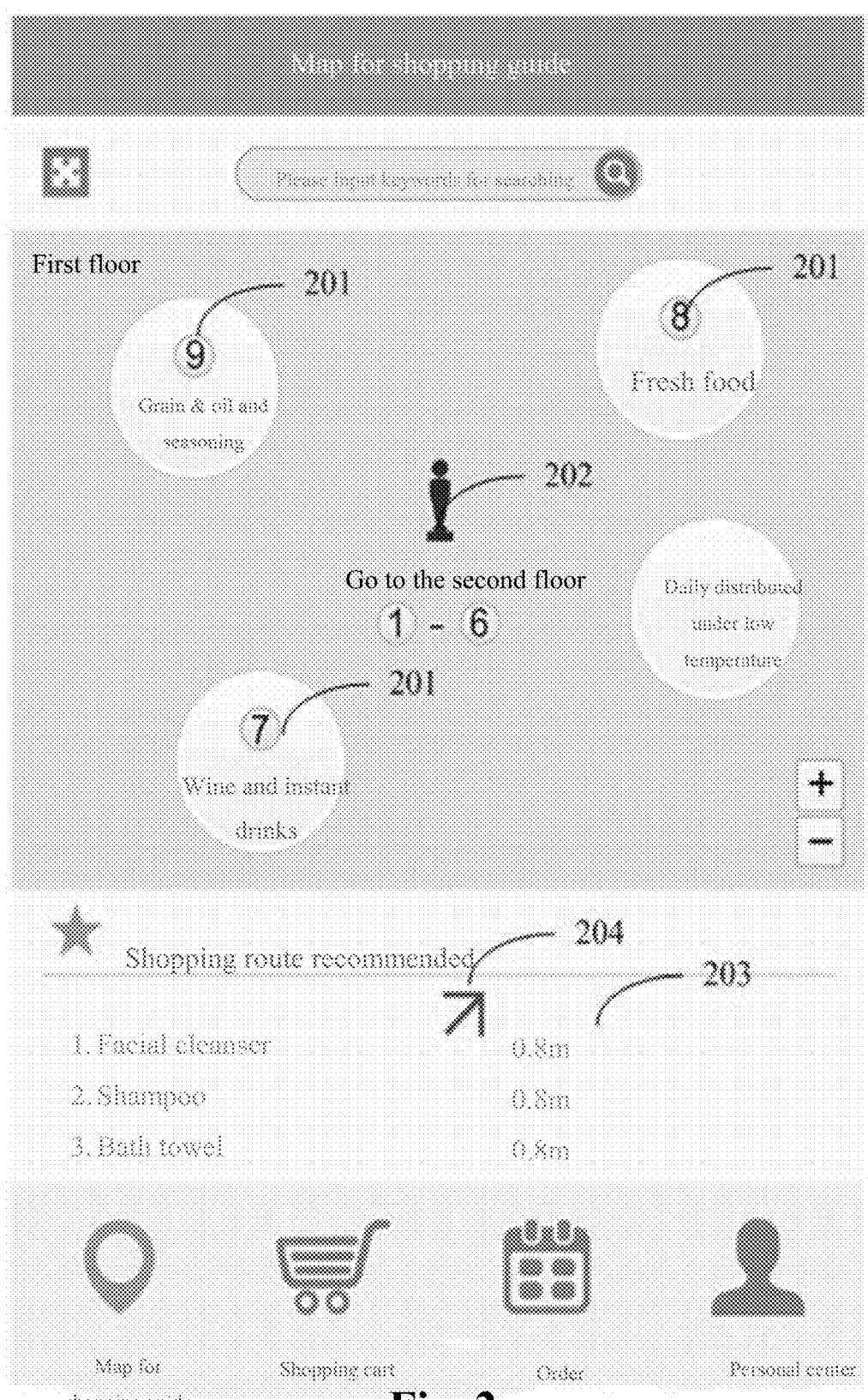
FIGS. 2a to 2d are schematic diagrams for prompting shopping guide of the embodiments of the present application during practical application.
Figure 2B:
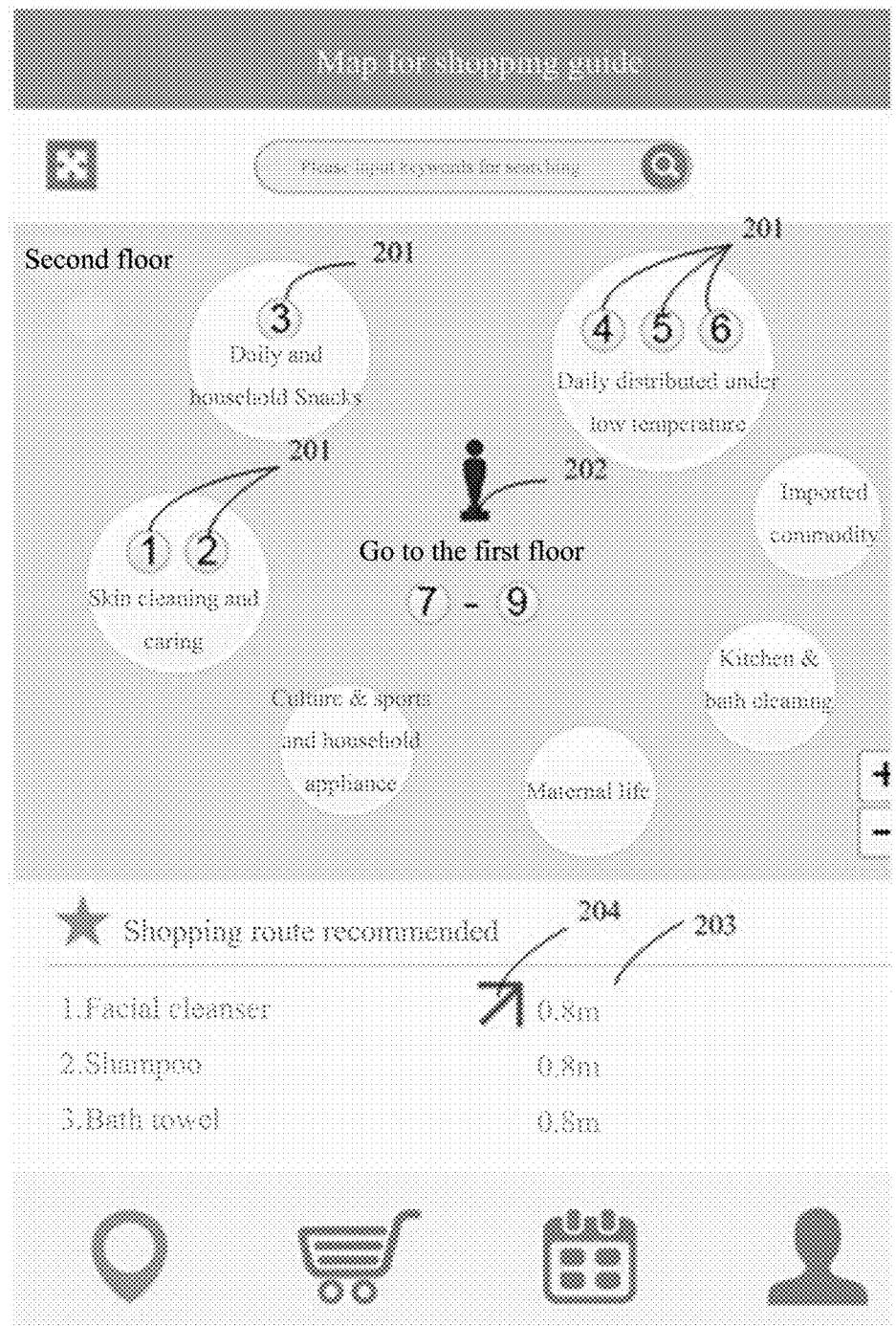

As shown in FIG. 2a and FIG. 2b, an arrangement number 201 of a pre-searching article is outputted in the article category distribution sub-map. Because the facial cleanser and the shampoo belong to a "skin cleaning and caring" article category, the arrangement numbers of the facial cleanser and the shampoo are outputted at a region position of the "skin cleaning and caring" article category; the bath towel belongs to a "daily and household" article category; therefore, the arrangement number of the bath towel is outputted at a region position of the "daily and household" article category, and so on; therefore, the arrangement number of the pre-searching article may be outputted at the region position corresponding to the article category to which the pre-searching article belongs. Meanwhile, a device position 202, i.e., a user position, may also be outputted. The device position 202 may be updated in real time according to movement of the user.

It is knowable from FIG. 2a and FIG. 2b that the place includes two rooms: a room in the first floor and a room in the second floor which are respectively corresponding to an article category distribution sub-map, wherein FIG. 2a is the article category distribution sub-map of the second floor, and FIG. 2b is the article category distribution sub-map of the first floor. When the user device acquires the navigation map, the article category distribution sub-map of any room may be outputted, or the article category distribution sub-map of the room closest to the device position of the user device may be outputted.

Wherein, the navigation prompt message, excluding the arrangement number of each pre-searching article 201, may also include distance information and direction information of the article position of each pre-searching article to the device position like the distance information 203 an the direction information 204 in FIG. 2a and FIG. 2b, wherein the direction information may include a navigation direction, and may be represented by using an arrow identity, as shown in FIG. 2a and FIG. 2b.

Of course, the navigation prompt message may also include navigation route information generated according to the article position of each pre-searching article and the distance between the device position and the article position of each pre-searching article, and the user device may output a navigation route in the navigation map according to the navigation route information.

The user may intuitively see the article position of each pre-searching article and the distance to the user according to the navigation prompt message in FIG. 2a and FIG. 2b, so that the user may select a searching sequence according to the navigation prompt message.

Figure 2C:
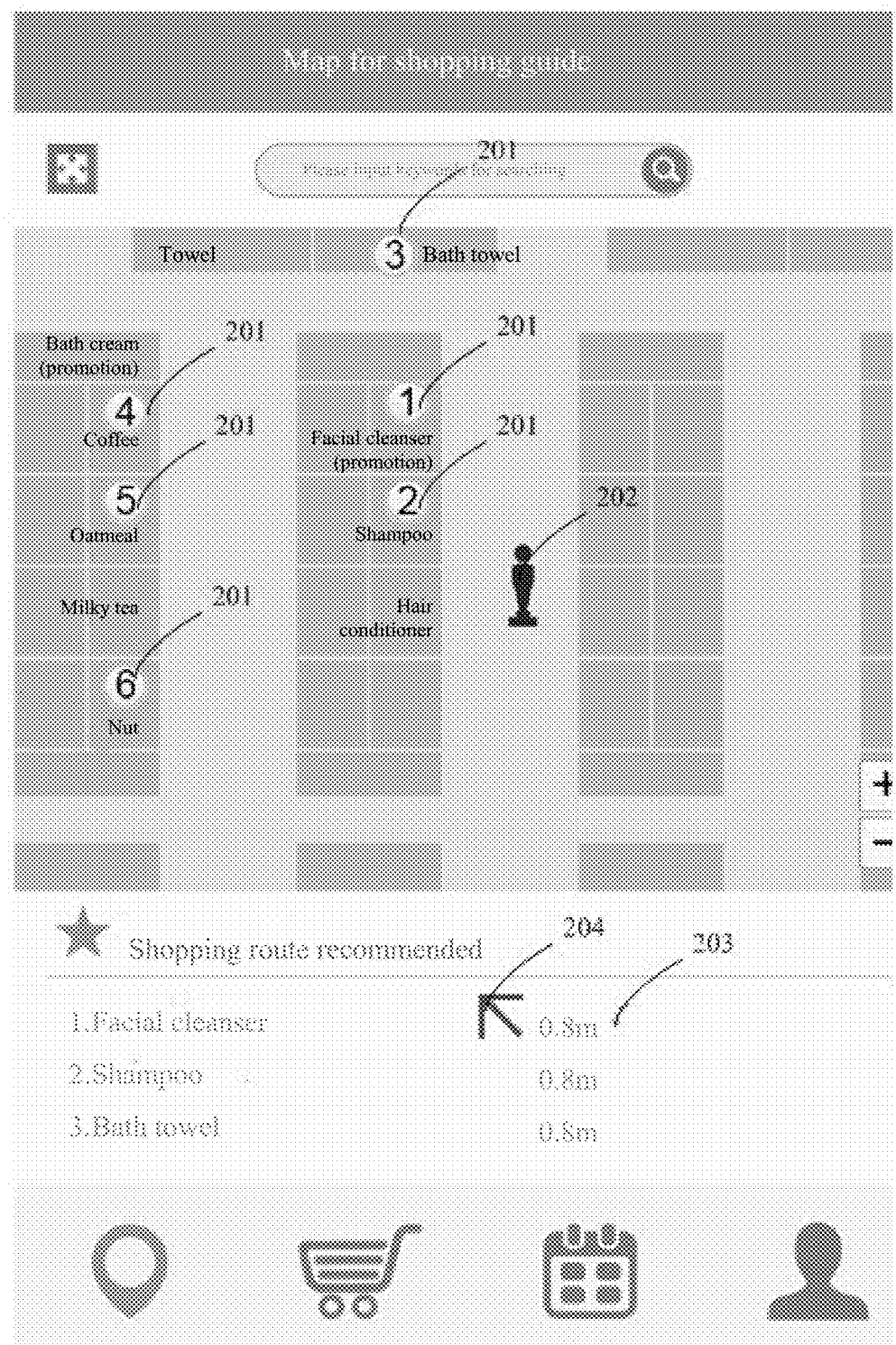

The user moves towards the region position of the "skin cleaning and caring" article category according to the navigation prompt message, wherein the shelf distribution sub-map is outputted when the distance to the region position of the "skin cleaning and caring" article category is less than the first preset distance, as shown in FIG. 2c, and the navigation prompt message is outputted in the shelf distribution sub-map. Therefore, the user may intuitively determine the article shelf in which the pre-searching article locates.

Figure 2D:
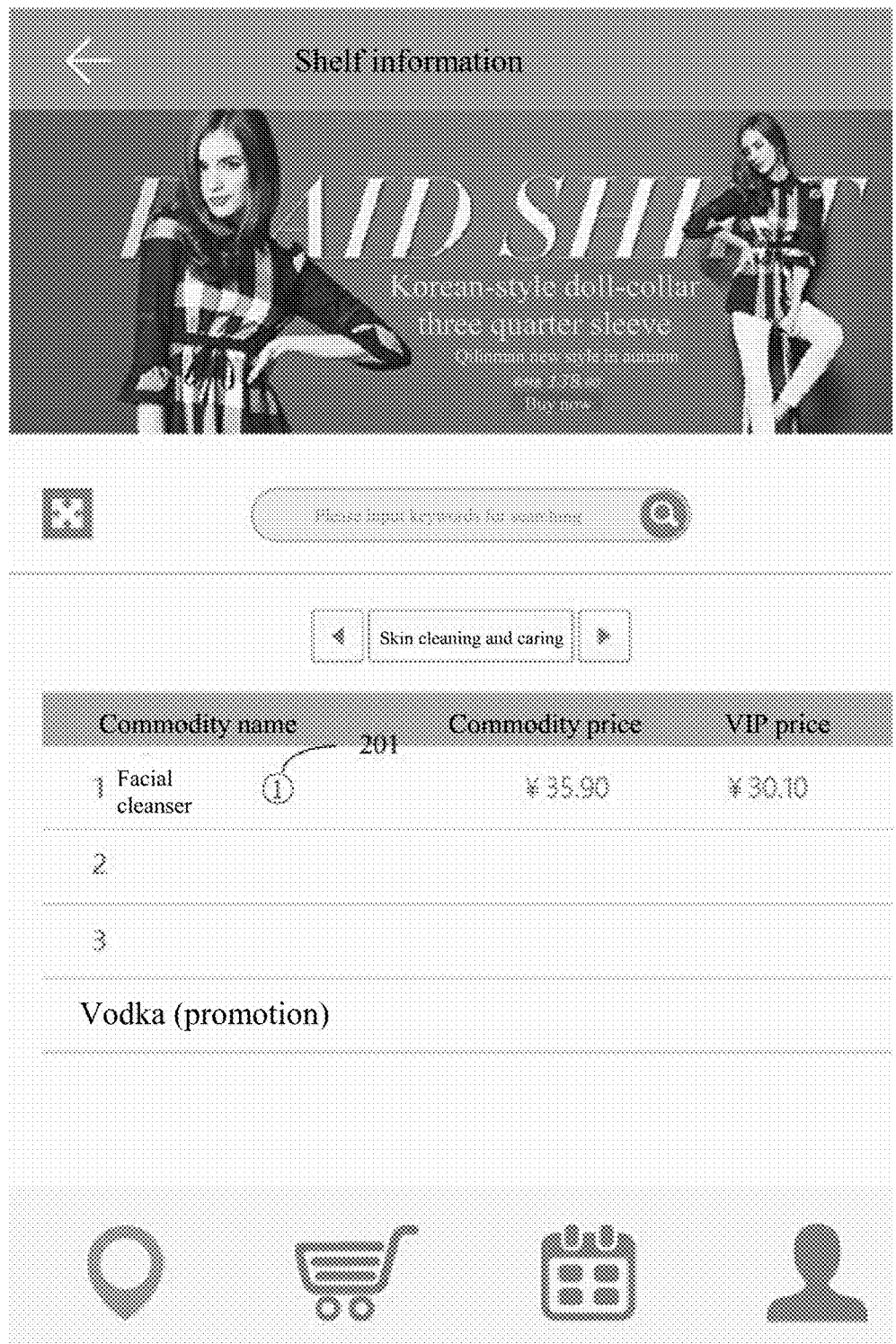

Further, when the distance of the user to the article shelf in which the facial cleanser locates is less than the second preset distance, the shelf article distribution sub-map of the article shelf is outputted, as shown in FIG. 2d, so that the user can intuitively determine the bracket of the article shelf on which the pre-searching article locates.

Information like an article of the article may also be outputted in the shelf article distribution sub-map.

Through the embodiments of the present application, when outputting the navigation prompt message in the navigation map, the user may intuitively acquire the article position of the pre-searching article and the distance to the user according to the navigation prompt message in the navigation map while searching articles, thus being capable of quickly finding the pre-searching article in the place, so that the searching time is saved, the searching convenience is improved, and the searching efficiency is increased.

Figure 3:
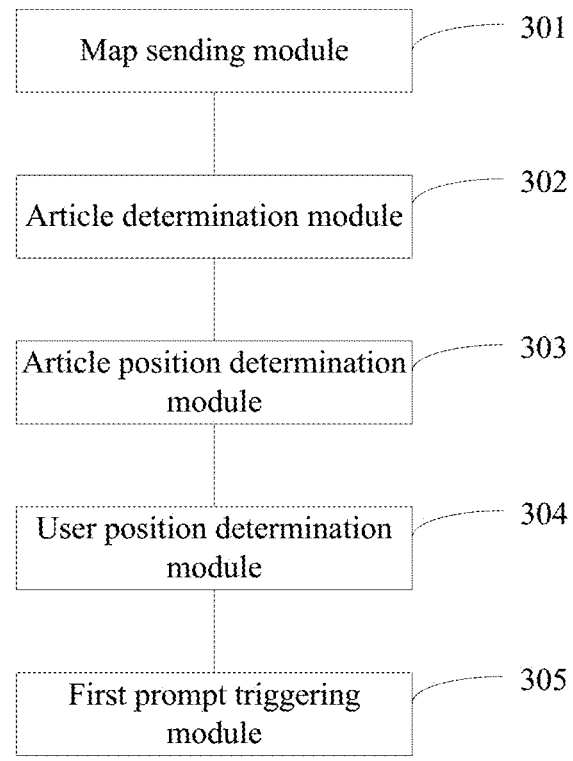
FIG. 3 is a structural schematic diagram of one embodiment of a prompting apparatus of the embodiments of the present application.

FIG. 3 is a structural schematic diagram of one embodiment of a prompting apparatus provided by the embodiments of the present application. The apparatus is specifically configured in a server, wherein the apparatus may include:

a map sending module 301 configured to send a navigation map requested to be outputted to a user device when receiving a map output request of the user device, the navigation map being outputted by the user device, wherein the navigation map is pre-generated according to an article position of an article in a place;

wherein, the map output request may carry a place identity and other information; to be specific, a navigation map corresponding to the place identity may be searched and sent to the user device, then the user device can output the navigation map; and an article determination module 302 configured to acquire article identification information of a pre-searching article.

The article identification information of the pre-searching article may be provided by the user through the user device, for example, inputted by the user, and then sent to the server by the user device, then the server may take an article corresponding to the article identification information as the pre-searching article.

As a probable implementation manner, the apparatus may also include:

an article recording module configured to acquire an article output request sent by the user device after send the navigation map requested to be outputted to the user device, the navigation map being outputted by the user device, the article output request being triggered by the user; send first article information of the article requested to be outputted in the article output request to the user device, the first article information at least including article identification information; and take an article corresponding to the first article information as the pre-searching article when receiving a pre-searching request sent by the user device, and record the article identification information of the pre-searching article, the pre-searching request being triggered by the user;

an article position determination module 303 configured to acquire an article position of the pre-searching article in the place;

a user position determination module 304 configured to acquire a device position of the user device in the place; and a first prompt triggering module 305 configured to generate a navigation prompt message according to a distance between the device position and an article position of each pre-searching article, and trigger the user device to output the navigation prompt message in the navigation map, the navigation prompt message being used for prompting the article position of each pre-searching article and a distance to the device position to a user.

Wherein, as another embodiment, the apparatus may also include:

a second prompt triggering module configured to generate an article prompt message according to the article position of the pre-searching article after acquiring the device position of the user device in the place, and trigger the user device to output the article prompt message at a display position of each pre-searching article in the navigation map, the article prompt message being used for prompting the article position of each pre-searching article to the user.

As another embodiment, the second prompt triggering module may generate the article prompt message according to the article position of the pre-searching article in case that the device position of the user device is not in the place, or the device position of the user device in the place cannot be acquired, and then the user device is triggered to output the corresponding article prompt message at the display position of each pre-searching article in the navigation map.

In order to further improve the searching convenience, as a probable implementation manner, the first prompt triggering module is specifically configured to:

determine an arrangement number of each pre-searching article according to an arrangement sequence of distances between the device position and the article position of each pre-searching article from the near to the distant; and generate the navigation prompt message including the arrangement number of each pre-searching article, and trigger the user device to output the arrangement number at the display position of each pre-searching article in the navigation map.

Moreover, as another embodiment, the first prompt triggering module may also generate navigation route information according to the article position of each pre-searching article and the distance between the device position and the article position of each pre-searching article.

Therefore, the first prompting module is specifically configured to generate the navigation prompt message including the arrangement number of each pre-searching article and the navigation prompt message of the navigation route information, and trigger the user device to output the arrangement number at the display position of each pre-searching article in the navigation map and output the navigation route information in the navigation map.

Wherein, in the embodiment of the present application, the navigation map may be pre-generated.

As another embodiment, each article shelf in the place may be provided with a wireless device; then the apparatus may also include:

a first map generating module configured to position a code scanning position of a hand-held device during each code scanning according to a received wireless signal sent by the wireless device when the hand-held device performs code scanning on each article in the article shelf and a position of the wireless device, and take the code scanning position of the hand-held device during each code scanning as an article position of an article subjected to the code scanning of the handheld device; and generate the navigation map according to the article position of each article.

Wherein, as a probable implementation manner, each article in the article shelf is corresponding to a wireless device.

The first map generating module may specifically be configured to:

determine a wireless device closest to the hand-held device according to the received wireless signal sent by the wireless device when the handheld device performs code scanning on each article in the article shelf; and position a position of the closest wireless device as the code scanning position of the hand-held device during code scanning.

Wherein, the first map generating module may also be configured to position a position of the hand-held device not subjected to code scanning while not performing code scanning according to the received wireless signal sent by the wireless device when the hand-held device does not perform code scanning and the position of the wireless device, and take the position of the hand-held device not subjected to code scanning as a position of the hand-held device not subjected to code scanning; and determine an article shelf position of each article shelf according to the position of each wireless device.

Then the first map generating module may specifically be configured to:

generate the navigation map according to each article shelf position, the article position of each article, and each shelf channel position.

Wherein, the generating, by the first map generating module, the navigation map according to each article shelf position, the article position of each article and each article shelf position may specifically be as follows:

generating an article category distribution sub-map according to the article position of each article and an article category of each article;

drawing an article shelf and a shelf channel with respect to each article category in the article category distribution sub-map and according to the article shelf position and the shelf channel position, and generating a shelf distribution sub-map corresponding to each article category;

generating a shelf article distribution sub-map corresponding to each article shelf with respect to each article shelf in the shelf distribution sub-map and according to the article position of each article; and establishing a correlation relationship among the article category sub-map, the shelf distribution sub-map, and the shelf article distribution sub-map, and generating the navigation map.

As another embodiment, each article shelf in the place is provided with a wireless device. The apparatus may also include:

a second map generating module configured to receive an article position of each article uploaded by the hand-held device, the article position being the code scanning position of the hand-held device during each code scanning according to the received wireless signal sent by the wireless device when the hand-held device performs code scanning on each article in the article shelf and the position of the wireless device; and generate the navigation map according to the article position of each article.

Wherein, the second map generating module may also be configured to position a position of the hand-held device not subjected to code scanning while not performing code scanning according to the received wireless signal sent by the wireless device when the hand-held device does not perform code scanning and the position of the wireless device, and take the position of the hand-held device not subjected to code scanning as a shelf channel position; and determine an article shelf position of each article shelf according to the position of each wireless device.

Then the second map generating module may specifically be configured to:

generate the navigation map according to each article shelf position, the article position of each article, and each shelf channel position.

Wherein, the generating, by the second map generating module, the navigation map according to each article shelf position, the article position of each article and each article shelf position may specifically be as follows:

generating an article category distribution sub-map according to the article position of each article and an article category of each article;

drawing an article shelf and a shelf channel with respect to each article category in the article category distribution sub-map and according to the article shelf position and the shelf channel position, and generating a shelf distribution sub-map corresponding to each article category;

generating a shelf article distribution sub-map corresponding to each article shelf with respect to each article shelf in the shelf distribution sub-map and according to the article position of each article; and establishing a correlation relationship among the article category sub-map, the shelf distribution sub-map, and the shelf article distribution sub-map, and generating the navigation map.

As another embodiment, the wireless device is arranged in each article shelf in the place, and each wireless device is corresponding to an article and a label. The label is used for displaying second article information of a corresponding article thereof; and The apparatus may also include:

a third map generating module configured to search a corresponding relationship between different labels and different wireless devices according to code scanning information acquired by the hand-held device through scanning each article in the article shelf and a corresponding label of the article, and take a position of a wireless device corresponding to a label of each article subjected to code scanning as an article position of the article; and generate the navigation map according to the article position of each article.

Wherein, the third map generating module may also be configured to position a position of the hand-held device not subjected to code scanning while not performing code scanning according to the received wireless signal sent by the wireless device when the hand-held device does not perform code scanning and the position of the wireless device, and take the position of the hand-held device not subjected to code scanning as a shelf channel position; and determine an article shelf position of each article shelf according to the position of each wireless device.

Then the third map generating module may specifically be configured to:

generate the navigation map according to each article shelf position, the article position of each article, and each shelf channel position.

Wherein, the generating, by the third map generating module, the navigation map according to each article shelf position, the article position of each article and each article shelf position may specifically be as follows:

generating an article category distribution sub-map according to the article position of each article and an article category of each article;

drawing an article shelf and a shelf channel with respect to each article category in the article category distribution sub-map and according to the article shelf position and the shelf channel position, and generating a shelf distribution sub-map corresponding to each article category;

generating a shelf article distribution sub-map corresponding to each article shelf with respect to each article shelf in the shelf distribution sub-map and according to the article position of each article; and establishing a correlation relationship among the article category sub-map, the shelf distribution sub-map, and the shelf article distribution sub-map, and generating the navigation map.

As another embodiment, the wireless device is arranged in each article shelf in the place, and each wireless device is corresponding to an article. Each wireless device is provided with a device information code.

The apparatus further includes:

a fourth map generating module configured to acquire code scanning information according to the code scanning performed by the hand-held device on each article in the article shelf, and the code scanning performed on the corresponding wireless device of the article; take a position of the wireless device corresponding to the device information code as the article position of the article subjected to code scanning according to the device information code in the code scanning information; and generate the navigation map according to the article position of each article.

Wherein, the fourth map generating module may also be configured to position a position of the hand-held device not subjected to code scanning while not performing code scanning according to the received wireless signal sent by the wireless device when the hand-held device does not perform code scanning and the position of the wireless device, and take the position of the hand-held device not subjected to code scanning as a shelf channel position; and determine an article shelf position of each article shelf according to the position of each wireless device.

Then the fourth map generating module may specifically be configured to:

generate the navigation map according to each article shelf position, the article position of each article, and each shelf channel position.

Wherein, the generating, by the fourth map generating module, the navigation map according to each article shelf position, the article position of each article and each article shelf position may specifically be as follows:

generating an article category distribution sub-map according to the article position of each article and an article category of each article;

drawing an article shelf and a shelf channel with respect to each article category in the article category distribution sub-map and according to the article shelf position and the shelf channel position, and generating a shelf distribution sub-map corresponding to each article category;

generating a shelf article distribution sub-map corresponding to each article shelf with respect to each article shelf in the shelf distribution sub-map and according to the article position of each article; and establishing a correlation relationship among the article category sub-map, the shelf distribution sub-map, and the shelf article distribution sub-map, and generating the navigation map.

Wherein, in each embodiment above, the position of the wireless device may be acquired through calculation.

As a probable implementation manner, the wireless device may include a first class device and a second class device, wherein a position of the first class device is known; the first class device may upload the wireless signal received to the server; and the second class device may upload the wireless signal received to the server. In order to facilitate signal transmission, a first control device, which may specifically be an AP ((Wireless Access Point, Wireless Access Point) may be arranged in an indoor ceiling of the place, and the wireless signals received by the first class device and the class second device are uploaded to the server through the first control device.

The apparatus may also include:

a first device positioning module configured to take the first class device and/or the second class device with determined position as the known device, and position a position of any second class device with indeterminate position according to the position of the known device and a wireless signal sent by any second class device with indeterminate position and received by the known device.

As another probable implementation manner, a second control device with known position is arranged in the indoor ceiling of the place. The second control device may be arranged in the indoor ceiling according to a preset arrangement.

The apparatus may also include:

a second device positioning module configured to position a position of the wireless device according to the wireless signal received by the second control device and sent by the wireless device and a position of the second control device.

It is knowable from the descriptions above that the navigation map may include an article category distribution sub-map, a shelf distribution sub-map and a shelf article distribution sub-map.

Therefore, as another embodiment, the map sending module is specifically configured to send the pre-generated navigation map to the user device when receiving a map output request of the user device, wherein the article category distribution sub-map is outputted by the user device.

The map sending module is also configured to, when a distance between the device position and any article category is less than a first preset distance, trigger the user device to output a shelf distribution sub-map corresponding to the article category after acquiring the device position of the user device in the place; and when a distance between the device position and any article shelf is less than a second preset distance, trigger the user device to output a shelf article distribution sub-map of the article shelf.

A first triggering request may be generated when the distance between the device position and any article category is less than the first preset distance, sent to the user device, and then a shelf distribution sub-map corresponding to the article category is outputted when the user receives the first triggering request; a second triggering request is generated when the distance between the device position and any article category is less than the second preset distance, sent to the user device, and then a shelf distribution sub-map corresponding to the article category is outputted when the user receives the second triggering request.

Wherein, when the wireless device is arranged in the article shelf of the place, the user device may also send a wireless signal to the wireless device or receive a wireless signal sent by the wireless device.

Therefore, the user position determination module is specifically configured to:

position a device position of the user device according to the wireless signal of the wireless device received by the user device and a position of the wireless device.

Figure 4:
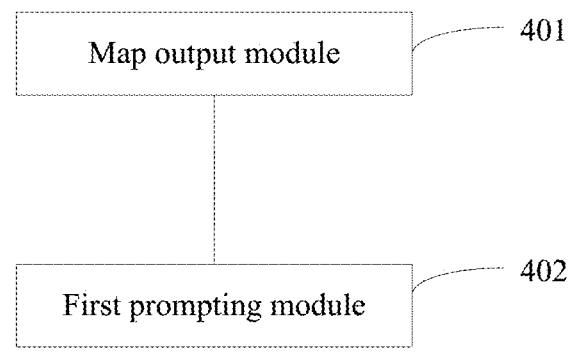
FIG. 4 is a structural schematic diagram of another embodiment of a prompting apparatus of the embodiments of the present application.

FIG. 4 is a structural schematic diagram of another embodiment of a prompting apparatus provided by the embodiments of the present application. The apparatus is specifically configured in a user device, wherein the apparatus may include:

a map output module 401 configured to send a map output request to a server, acquire a navigation map requested to be outputted by a user device and provided by the server and output the navigation map, the navigation map being pre-generated according to an article position of an article in a place;

a first prompting module 403 configured to acquire a navigation prompt message sent by the server, and output the navigation prompt message in the navigation map, the navigation prompt message being generated by the server according to an article position of the pre-searching article in the place and a device position of the user device in the place, and according to a distance between the device position and an article position of each pre-searching article, and the navigation prompt message being used for prompting the article position of each pre-searching article and a distance to the device position to a user.

Wherein, the pre-searching article may be determined by the user according to article identification information inputted and provided by the user.

As a probable implementation manner, the apparatus may also include:

an article request module configured to receive an article output request triggered by the user with respect to any article in the navigation map, and send the article output request to the server; receive first article information of the article requested to be outputted of the user device sent by the server; and send a pre-searching request to the server to facilitate the server to take an article corresponding to the first article information as the pre-searching article and record article identification information of the pre-searching article.

Wherein, as another embodiment, the apparatus may also include:

a second prompting module configured to acquire an article prompt message sent by the server; and output the article prompt message at a display position of each pre-searching article in the navigation map according to the article position of the pre-searching article, the article prompt message being used for prompting the article position of each pre-searching article to the user.

Wherein, the article prompt message may be the article prompt message generated according to the article position of the pre-searching article in case that the device position of the user device is not in the place, or the device position of the user device in the place cannot be acquired; and then the user device is triggered to output the corresponding article prompt message at the display position of each pre-searching article in the navigation map.

In order to further improve the searching convenience, as a probable implementation manner, the navigation prompt message includes an arrangement number of each pre-searching article determined by the server according to an arrangement sequence of distances between the device position and the article position of each pre-searching article from the near to the distant; and the first prompting module is specifically configured to output the arrangement number at the display position of each pre-searching article in the navigation map.

Moreover, as another embodiment, the navigation prompt message generate further includes the navigation route information generated according to the article position of each pre-searching article and the distance between the device position and the article position of each pre-searching article; and the first prompting module is also configured to output the navigation route information in the navigation map.

More rooms may be included in the place, and the different rooms may be arranged different floors, while more article shelves are arranged in each room, wherein the articles are specifically arranged in the article shelf, while articles belonging to the same article category are usually arranged in the same region.

Therefore, the navigation map may include an article category distribution sub-map, a shelf distribution sub-map and a shelf article distribution sub-map.

The article category distribution sub-map is generated according to a region portion of the article category of each article; the shelf distribution sub-map is generated according to a shelf position of each article shelf; and the article category distribution sub-map is generated according to the article category of each article.

Then, the map output module is specifically configured to acquire a navigation map requested to be outputted by the user device and provided by the server and output the article category distribution sub-map;

when receiving a first triggering request generated when the server detects that a distance between the device position of the user device and any article category is less than a first preset distance, output a shelf distribution sub-map corresponding to the article category; and when receiving a second triggering request generated when the server detects that a distance between the device position and any article shelf is less than a second preset distance, output a shelf distribution sub-map corresponding to the article shelf.

The embodiments of the present application also provide a system for prompting shopping guide, including a server and a user device. The server is configured with the prompting apparatus as shown in FIG. 3, and the user device is configured with the prompting apparatus as shown in FIG. 4.

Therefore, the embodiments of the present application also provide a user device, and the user device may include a memory and a processor;

the memory is stored with one set or more sets of program instructions; and the processor is configured to invoke and perform the one set or more set of program instructions in the memory to implement the following operations:

sending a map output request to a server;

acquiring a navigation map requested to be outputted by the user device and provided by the server, and outputting the navigation map, the navigation map being pre-generated according to an article position of an article in a place;

providing article identification information of the pre-searching article to the server;

acquiring a navigation prompt message sent by the server, the navigation prompt message being generated by the server according to an article position of the pre-searching article in the place and a device position of the user device in the place, and according to a distance between the device position and an article position of each pre-searching article; and outputting the navigation prompt message in the navigation map, the navigation prompt message being used for prompting the article position of each pre-searching article and a distance to the device position to a user.

The embodiments of the present application also provide a server, and the server may include a memory and a processor;

the memory is stored with one set or more sets of program instructions; and the processor is configured to invoke and perform the one set or more set of program instructions in the memory to implement the following operations:

sending a navigation map requested to be outputted to a user device when receiving a map output request of the user device, the navigation map being outputted by the user device, wherein the navigation map is pre-generated according to an article position of an article in a place;

acquiring article identification information of a pre-searching article;

acquiring an article position of the article to be searched in the place;

acquiring a device position of the user device in the place; and generating a navigation prompt message according to a distance between the device position and an article position of each pre-searching article, and triggering the user device to output the navigation prompt message in the navigation map, the navigation prompt message being used for prompting the article position of each article to be searched and a distance to the device position to a user.

Through the prompting system of the embodiment of the present application, when having a searching demand, the user may request to acquire the navigation map from the server, and output the navigation map through the user device; then the server generates the navigation prompt message according to the article position of the pre-searching article and the device position of the user device, the navigation prompt message being outputted by the user device in the navigation map, wherein, the navigation prompt message is used for prompting the article position of each pre-searching article and the distance to the device position to the user; the user may intuitively acquire the article position of the pre-searching article and the distance to the user according to the navigation prompt message in the navigation map while searching articles, thus being capable of quickly finding the pre-searching article in the place, so that the searching time is saved, the searching convenience is improved, and the searching efficiency is increased.

The functions described in the methods of the embodiments of the present application may be stored in a computing device readable storage medium if being implemented in a form of software functional units and sold or used as an independent product. Based on such understanding, the part of the embodiments of the present application contributing to the prior art, or the part of the technical solution may be implemented in the form of a software product. The computer software product is stored in a storage medium, and includes several instructions for instructing a computing device (which may be a personal computer, a server, a mobile computing device or a network device so on) to execute all or a part of steps of the method according to each embodiment of the present application. While the forementioned storage medium includes: any medium that is capable of storing program codes, such as a USB disk, a mobile hard disk drive, a read-only memory (ROM, Read-Only Memory), a random access memory (RAM, Random Access Memory), a magnetic disk, or an optical disk.

The explanation above shows and describes a plurality of preferred embodiments of the present application, but as previously mentioned, it should be understood that the present application is not limited to the forms disclosed herein, and shall not be deemed as an exclusion to other embodiments, but can be applied to various other combinations, amendments and circumstances, and can be modified through the foregoing teaching or technologies or knowledge of related arts within the scope of the application concept herein. While modifications and changes made by those skilled in the art without departing from the spirit and scope of the present application shall all fall within the protection scope of the claims of the present application appended.

The invention claimed is:

1. A prompting method, comprising:
sending, by a server, a navigation map requested to be outputted to a user device when receiving a map output request of the user device, the navigation map being outputted by the user device, wherein the navigation map is pre-generated according to each article shelf position, each shelf channel position and an article position of each article in a place;
acquiring article identification information of a pre-searching article;
acquiring an article position of the pre-searching article in the place;
acquiring a device position of the user device in the place; and
generating a navigation prompt message according to a distance between the device position and an article position of each pre-searching article, and triggering the user device to output the navigation prompt message in the navigation map, the navigation prompt message being used for prompting the article position of each pre-searching article and a distance to the device position to a user.

2. The method according to claim 1, wherein after the acquiring the article position of the pre-searching article in the place, the method further comprises:
generating an article prompt message according to the article position of the pre-searching article, and triggering the user device to output the article prompt message at a display position of each pre-searching article in the navigation map, the article prompt message being used for prompting the article position of each pre-searching article to the user.

3. The method according to claim 1, wherein the generating the navigation prompt message according to the distance between the device position and the article position of each pre-searching article, and triggering the user device to output the navigation prompt message in the navigation map comprises:
determining an arrangement number of each pre-searching article according to an arrangement sequence of distances between the device position and the article position of each pre-searching article from the near to the distant; and
generating the navigation prompt message comprising the arrangement number of each pre-searching article, and triggering the user device to output the arrangement number at the display position of each pre-searching article in the navigation map.

4. The method according to claim 3, wherein the generating the navigation prompt message comprising the arrangement number of each pre-searching article, and triggering the user device to output the arrangement number at the display position of each pre-searching article in the navigation map comprises:
generating navigation route information according to the article position of each pre-searching article and the distance between the device position and the article position of each pre-searching article; and
generating the navigation prompt message comprising the arrangement number of each pre-searching article and the navigation route information, and triggering the user device to output the arrangement number at the display position of each pre-searching article in the navigation map and output the navigation route information in the navigation map.

5. The method according to claim 1, wherein a wireless device is arranged in each article shelf in the place; and
the navigation map is pre-generated according to a following manner:
positioning a code scanning position of a hand-held device during each code scanning according to a received wireless signal sent by the wireless device when the hand-held device performs code scanning on each article in the article shelf and a position of the wireless device, and taking the code scanning position of the hand-held device during each code scanning as an article position of an article subjected to the code scanning of the handheld device; and
generating the navigation map according to the article position of each article.

6. The method according to claim 1, wherein each article in the article shelf is corresponding to a wireless device; and
the positioning the code scanning position of the hand-held device during each code scanning according to the received wireless signal sent by the wireless device when the hand-held device performs code scanning on each article in the article shelf and the position of the wireless device comprises:
determining a wireless device closest to the hand-held device according to the received wireless signal sent by the wireless device when the handheld device performs code scanning on each article in the article shelf; and positioning a position of the closest wireless device as the code scanning position of the hand-held device during code scanning.

7. The method according to claim 1, wherein a wireless device is arranged in each article shelf in the place; and
the navigation map is pre-generated according to a following manner:
receiving the article position of each article uploaded by the hand-held device, the article position is the code scanning position during each code scanning positioned when the handheld device performs code scanning on each article in the article shelf according to the received wireless signal of the wireless device during each code scanning and the position of the wireless device; and
generating the navigation map according to the article position of each article.

8. The method according to claim 1, wherein the wireless device is arranged in each article shelf in the place, and each wireless device is corresponding to an article and a label, the label being used for displaying second article information of a corresponding article thereof; and
the navigation map is pre-generated according to a following manner:
searching a corresponding relationship between different labels and different wireless devices according to code scanning information acquired by the hand-held device through scanning each article in the article shelf and a corresponding label of the article, taking a position of a wireless device corresponding to a label of each article subjected to code scanning as an article position of the article; and
generating the navigation map according to the article position of each article.

9. The method according to claim 1, wherein the wireless device is arranged in each article shelf in the place, and each wireless device is corresponding to an article; and each wireless device is provided with a device information code; and
the navigation map is pre-generated according to a following manner:
acquiring code scanning information according to the code scanning performed by the hand-held device on each article in the article shelf, and the code scanning performed on the corresponding wireless device of the article;
taking a position of the wireless device corresponding to the device information code as the article position of the article subjected to code scanning according to the device information code in the code scanning information; and
generating the navigation map according to the article position of each article.

10. The method according to claim 5, wherein before the generating the navigation map according to the article position of each article, the method further comprises:
positioning a position of the hand-held device when the hand-held device does not perform code scanning as a shelf channel position according to the received wireless signal of the wireless device when the hand-held device does not perform code scanning and the position of the wireless device; and
determining an article shelf position of each article shelf according to the position of each wireless device; and
generating the navigation map according to each article shelf position, the article position of each article, and each shelf channel position.

11. The method according claim 9, wherein the generating the navigation map according to each article shelf position, the article position of each article, and each shelf channel position comprises:
generating an article category distribution sub-map according to the article position of each article and an article category of each article;
drawing an article shelf and a shelf channel with respect to each article category in the article category distribution sub-map and according to the article shelf position and the shelf channel position, and generating a shelf distribution sub-map corresponding to each article category;
generating a shelf article distribution sub-map corresponding to each article shelf with respect to each article shelf in the shelf distribution sub-map and according to the article position of each article; and
establishing a correlation relationship among the article category sub-map, the shelf distribution sub-map, and the shelf article distribution sub-map, and generating the navigation map.

12. The method according to claim 10, wherein the sending, by the server, the navigation map requested to be outputted to the user device when receiving the map output request of the user device, the navigation map being outputted by the user device comprises:
sending, by the server, a navigation map pre-generated to the user device when receiving the map output request of the user device, the article category distribution sub-map being outputted by the user device; and
after the acquiring the device position of the user device in the place, the method further comprises:
when a distance between the device position and any article category is less than a first preset distance, triggering the user device to output a shelf distribution sub-map corresponding to the article category; and
when a distance between the device position and any article shelf is less than a second preset distance, triggering the user device to output a shelf article distribution sub-map of the article shelf.

13. The method according to claim 1, wherein the pre-searching article is pre-determined according to a following manner:
acquiring an article output request sent by the user device after sending the navigation map requested to be outputted to the user device, the navigation map being outputted by the user device, the article output request being triggered by the user;
sending first article information of the article requested to be outputted in the article output request to the user device, the first article information being outputted by the user device, the first article information at least comprising the article identification information; and
taking an article corresponding to the first article information as the pre-searching article when receiving a pre-searching request sent by the user device, and recording the article identification information of the pre-searching article, the pre-searching request being triggered by the user.

14. A prompting method, comprising:
sending, by a user device, a map output request to a server;
acquiring a navigation map requested to be outputted by the user device and provided by the server, and outputting the navigation map, the navigation map being pre-generated according to each article shelf position, each shelf channel position and an article position of an article in a place;

acquiring a navigation prompt message sent by the server, the navigation prompt message being generated by the server according to an article position of the pre-searching article in the place and a device position of the user device in the place, and according to a distance between the device position and an article position of each pre-searching article; and outputting the navigation prompt message in the navigation map, the navigation prompt message being used for prompting the article position of each pre-searching article and a distance to the device position to a user.

15. The method according to claim 14, after the acquiring the navigation map requested to be outputted by the user device and provided by the server, and outputting the navigation map, the method further comprises:

acquiring an article prompt message sent by the server; and outputting the article prompt message at a display position of each pre-searching article in the navigation map according to the article position of the pre-searching article, the article prompt message being used for prompting the article position of each pre-searching article to the user.

16. The method according to claim 14, wherein the navigation prompt message comprises an arrangement number of each pre-searching article determined by the server according to an arrangement sequence of distances between the device position and the article position of each pre-searching article from the near to the distant; and the outputting the navigation prompt message in the navigation map comprises:

outputting the arrangement number at the display position of each pre-searching article in the navigation map.

17. The method according to claim 16, wherein the navigation prompt message further comprises navigation route information generated by the server according to the article position of each pre-searching article and the distance between the device position and the article position of each pre-searching article; and while outputting the arrangement number at the display position of each pre-searching article in the navigation map, the method further comprises:

outputting the navigation route information in the navigation map.

18. The method according to claim 14, wherein the navigation map comprises an article category distribution sub-map, a shelf distribution sub-map, and a shelf article distribution sub-map; and the acquiring the navigation map requested to be outputted by the user device and provided by the server, and outputting the navigation map comprises:

acquiring the navigation map requested to be outputted by the user device and provided by the server, and outputting the article category distribution sub-map;

when receiving a first triggering request generated when the server detects that a distance between the device position of the user device and any article category is less than a first preset distance, outputting a shelf distribution sub-map corresponding to the article category; and when receiving a second triggering request generated when the server detects that a distance between the device position and any article shelf is less than a second preset distance, outputting a shelf distribution sub-map corresponding to the article shelf.

19. The method according to claim 14, wherein the pre-searching article is pre-determined according to a following manner:

receiving an article output request triggered by the user with respect to any article in the navigation map, and sending the article output request to the server;

receiving first article information of an article requested to be outputted by the user device and sent by the server, the first article information at least comprising article identification information; and sending a pre-searching request to the server to facilitate the server to take an article corresponding to the first article information as the pre-searching article and record article identification information of the pre-searching article.

20. A prompting apparatus, comprising:

at least one processor and a memory coupled to the at least one processor;

wherein the at least one processor is configured to:

send a navigation map requested to be outputted to a user device when receiving a map output request of the user device, the navigation map being outputted by the user device, wherein the navigation map is pre-generated according to each article shelf position, each shelf channel position and an article position of an article in a place;

acquire article identification information of a pre-searching article;

acquire an article position of the pre-searching article in the place;

acquire a device position of the user device in the place; and generate a navigation prompt message according to a distance between the device position and an article position of each pre-searching article, and trigger the user device to output the navigation prompt message in the navigation map, the navigation prompt message being used for prompting the article position of each pre-searching article and a distance to the device position to a user.

21. A prompting apparatus, comprising:

at least one processor and a memory coupled to the at least one processor;

wherein the at least one processor is configured to perform the method of claim 14.

* * * * *

UNITED STATES PATENT AND TRADEMARK OFFICE
CERTIFICATE OF CORRECTION

PATENT NO. : 9,973,894 B2  
APPLICATION NO. : 15/379470  
DATED : May 15, 2018  
INVENTOR(S) : ZhongGuang Pan et al.

Page 1 of 1

It is certified that error appears in the above-identified patent and that said Letters Patent is hereby corrected as shown below:

On the Title Page

Item (73), under "Assignee", in Column 1, Line 1, delete "SHANG HAI SHI TOU ZI GUAN LI YOU XIAN GONG SI" and insert -- SHANG HAI PAN SHI TOU ZI GUAN LI YOU XIAN GONG SI --, therefor.

Signed and Sealed this  
Tenth Day of July, 2018

Andrei Iancu  
*Director of the United States Patent and Trademark Office*